United States Patent
Chantry

(10) Patent No.: US 8,688,815 B2
(45) Date of Patent: Apr. 1, 2014

(54) SYSTEM AND METHOD FOR WELDER WITH HELP REQUEST FUNCTIONALITY

(75) Inventor: Bruce John Chantry, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 315 days.

(21) Appl. No.: 12/915,315

(22) Filed: Oct. 29, 2010

(65) Prior Publication Data

US 2012/0110091 A1 May 3, 2012

(51) Int. Cl.
*G06F 15/173* (2006.01)

(52) U.S. Cl.
USPC ............................. 709/223; 709/206; 219/136

(58) Field of Classification Search
USPC ............................ 709/206, 223–224; 219/136
See application file for complete search history.

(56) References Cited

U.S. PATENT DOCUMENTS

| | | | |
|---|---|---|---|
| 6,486,439 B1 | 11/2002 | Spear et al. | |
| 6,624,388 B1 | 9/2003 | Blankenship et al. | |
| 6,744,011 B1* | 6/2004 | Hu et al. | 219/130.01 |
| 6,795,778 B2 | 9/2004 | Dodge et al. | |
| 6,912,447 B2 | 6/2005 | Klimko et al. | |
| 7,220,941 B2 | 5/2007 | Niedereder et al. | |
| 7,245,875 B2 | 7/2007 | Clark et al. | |
| 7,375,304 B2 | 5/2008 | Kainec et al. | |
| 7,683,290 B2 | 3/2010 | Daniel et al. | |
| 7,687,741 B2 | 3/2010 | Kainec et al. | |
| 2001/0037363 A1* | 11/2001 | Battilega et al. | 709/204 |
| 2004/0099648 A1* | 5/2004 | Hu et al. | 219/130.01 |
| 2005/0103767 A1 | 5/2005 | Kainec | |
| 2006/0207980 A1* | 9/2006 | Jacovetty et al. | 219/130.5 |
| 2008/0189612 A1 | 8/2008 | Zhang | |
| 2009/0313549 A1* | 12/2009 | Casner et al. | 715/740 |
| 2010/0048273 A1* | 2/2010 | Wallace et al. | 463/7 |
| 2010/0312605 A1* | 12/2010 | Mitchell et al. | 705/9 |
| 2011/0114611 A1* | 5/2011 | Cole | 219/130.1 |

OTHER PUBLICATIONS

International Search Report; corresponding PCT Application No. PCT/IB2011/002568 filed Oct. 31, 2011; Authorized Officer Gruber, Ralph; Dated Feb. 23, 2012.
Written Opinion; corresponding PCT Application No. PCT/IB2011/002568 filed Oct. 31, 2011; Authorized Officer Caubet, J.; Dated Feb. 23, 2012.
Written Opinion for PCT/IB2011/002568 dated Nov. 15, 2012.

* cited by examiner

*Primary Examiner* — Oanh Duong
(74) *Attorney, Agent, or Firm* — Pearne & Gordon LLP

(57) ABSTRACT

A welder includes a network interface configured to connect to a network. The welder includes a user interface that indicates to a user entities to whom help requests may be sent and receives from the user a selection of an entity to whom to send a help request. A data store stores welder data and entity data. The welder data includes welder identification and location information, and the entity data correlates entities to respective communication modes. The welder includes a communication logic that receives signals from the user interface indicating the selection and receives from the data store the welder data and the entity data. The communication logic also generates the help request in at least one format corresponding and directed to a communication mode correlated to the selected entity. The welder further includes a processor that causes the network interface to transmit the help request in the network.

20 Claims, 8 Drawing Sheets

DATA STORE
340

ENTITY DATA
342

| ENTITY | MODE | ADDRESS |
|---|---|---|
| Maintenance | Email | maint@lincolnelectric.com |
| Quality | Voice | (216) 555-5555 |
| Production | SMS | (216) 555-5556 |
| Safety | Email | safe@lincolnelectric.com |
| Security | IM | 207.53.155.1 |
| Emergency | Voice | 911 |

WELDER DATA
344

| WELDER | SERIAL | IP | LOCATION |
|---|---|---|---|
| PW S350 | S009876543 | 207.54.157.1 | 1ST QUADRANT OF RIM PRODUCTION FLOOR 22801 St. Clair Ave. Cleveland, OH 44117 |

To: Maintenance Department (maint@lincolnelectric.com)
From: PW S350 S009876543 207.54.157.1
Subject: HELP REQUEST This is a HELP REQUEST generated by welder PW S350 which is located at:

1st Quadrant of Rim Production Floor
22801 St. Clair Ave.
Cleveland, OH 44117

_(cid:9)US 8,688,815 B2_

SYSTEM AND METHOD FOR WELDER WITH HELP REQUEST FUNCTIONALITY

FIELD OF INVENTION

The present disclosure relates generally to the field of welding and welding equipment. More particularly, the present disclosure relates to a welder with functionality for transmitting help requests.

BACKGROUND

Welding systems are deployed in manufacturing facilities that often employ hundreds or thousands of welders. One example of such welders include electric arc welders. These systems are often deployed over great distances in relatively large manufacturing environments and are often spread across multiple manufacturing centers. Moreover, given the nature and requirements of modern and relatively complex manufacturing operations, increasing challenges are faced in upgrading, maintaining, servicing, and supplying welding systems.

Often when upgrading, maintaining, servicing, and supporting is necessary, a user or operator of the welder must request help from an appropriate entity that has the expertise, tools, authority, and so on. Such an entity includes, but is not limited to, quality, maintenance, service, or engineering departments, and so on. Often conventional welding systems require the user to stop production to request help, which may cause delays or disruptions in the manufacturing process.

SUMMARY

A welder with help request functionality includes a network interface configured to connect to a network. The welder further includes a user interface configured to indicate to a user one or more entities to whom help requests may be sent and further configured to receive from the user a selection indicating a selected entity from the one or more entities to whom to send a help request. The welder further includes a data store storing welder data and entity data. The welder data includes welder identification and location information and the entity data includes data correlating entities from the one or more entities to respective communication modes. The welder further includes a communication logic configured to receive a signal from the user interface indicating the selection and further configured to receive from the data store the welder data and the entity data corresponding to the welder and the selected entity respectively. The communication logic is further configured to generate the help request in at least one format corresponding and directed to a communication mode correlated to the selected entity. The welder further includes a processor operably connected to the network interface and the communication logic and configured to cause the network interface to transmit the help request in the network.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

FIG. 3b illustrates the content of an exemplary data store for an exemplary welding system with help request communication functionality.

DETAILED DESCRIPTION

Figure 1:
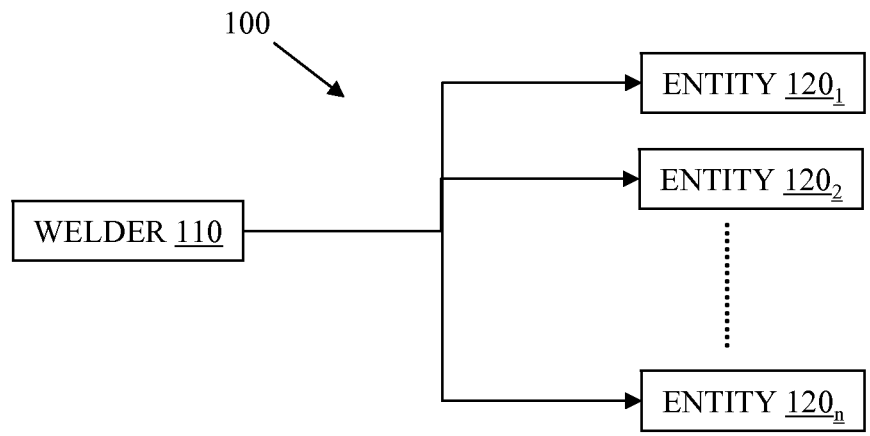
FIG. 1 illustrates a simplified block diagram of an exemplary welding system with help request communication functionality.

FIG. 1 illustrates a simplified block diagram of a welding system 100 with help request communication capability. The system 100 includes a welder 110. The welder 110 is equipped such that a user at the welder 110 may convey help requests via the welder 110 to a plurality of entities $120_{1-n}$. An entity may be an individual, a group of individuals, a machine, a plurality of machines, an application program, a computer, a network of computers, combinations thereof, and so on.

A user of the welder 110 may access a display of a subset of entities via operation of a user interface in the welder 110. In one embodiment, the user may choose an appropriate entity to receive the help request from the subset of entities displayed by the welder 110. In another embodiment, the user may select a subject or context to which the help request relates and the system 100 identifies the appropriate entity or entities to receive the help request. For example, the user may request help with a quality issue by selecting "quality" as the context and the system may send a help request to a quality engineering department. The system 100 conveys the help request to the appropriate entity via a communication mode (e.g., electronic mail, voice, text message, and so on) that is the most suitable given the context or the entity.

Figure 2:
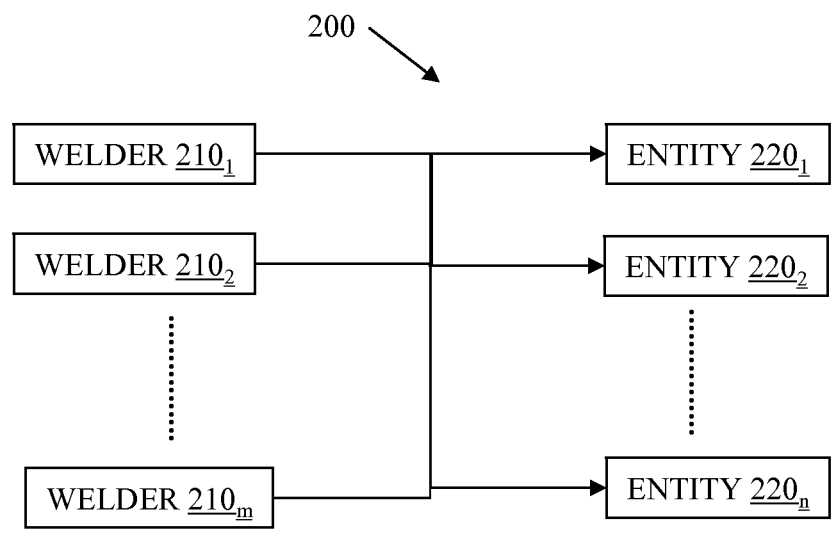
FIG. 2 illustrates a simplified block diagram of an exemplary welding system including multiple welders with help request communication functionality.

FIG. 2 illustrates a simplified block diagram of a welding system 200 with help request communication capability. The system 200 comprises a plurality of welders $210_{1-m}$. In one embodiment, the welding system includes one or more networks of welders. In another embodiment (not shown), the welding system includes other machines or equipment that relate to welding and are connected in the network. At least some of the welders $210_{1-m}$ are equipped such that users may convey help requests via the welders $210_{1-m}$ to a plurality of entities $220_{1-n}$.

Figure 3:
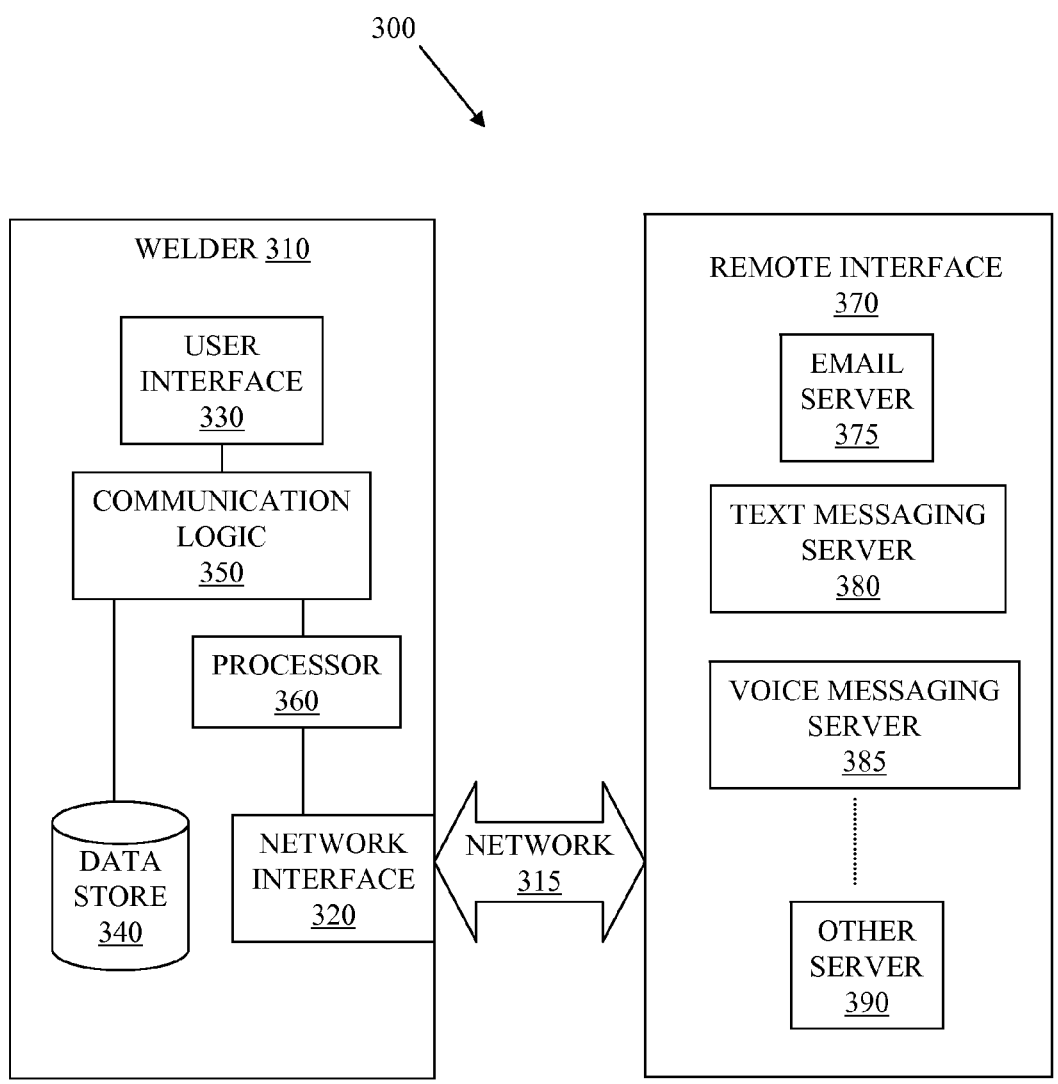
FIG. 3 illustrates a block diagram of an exemplary welding system with help request communication functionality.

FIG. 3 illustrates a block diagram of an exemplary welding system 300. The welding system 300 includes a welder 310. The welder 310 includes a network interface 320 that connects the welder 310 to a network 315. The network interface 320 may connect the welder 310 to Local Area Networks (LAN) through technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4), combinations thereof, and so on. Similarly, the network interface 320 may connect the welder 310 to Wide Area Networks (WAN) through technologies including, but not limited to, point to point links, circuit switching networks like integrated services digital networks (ISDN), cable internet, WiMAX, High-Speed Downlink Packet Access (HSDPA), packet switching networks, and digital subscriber lines (DSL). While individual network types are described, it is to be appreciated that communications via, over, or through a network may include combinations and mixtures of communications.

The welder 310 further includes a user interface 330. The user interface 330 indicates to a user of the welder 310 one or more entities to whom help requests may be sent. The user interface 330 also receives from the user a selection indicating a selected entity or entities from the plurality of entities. In one embodiment (not shown), a user interface logic controls at least some functionality of the user interface 330. The user interface logic causes the user interface 330 to display at least one entity corresponding to one or more persons to whom help requests may be sent. The user interface logic also receives a selection signal including data indicating the user selection of an entity or entities via the user interface 330 on the welder 310.

Figure 3A:
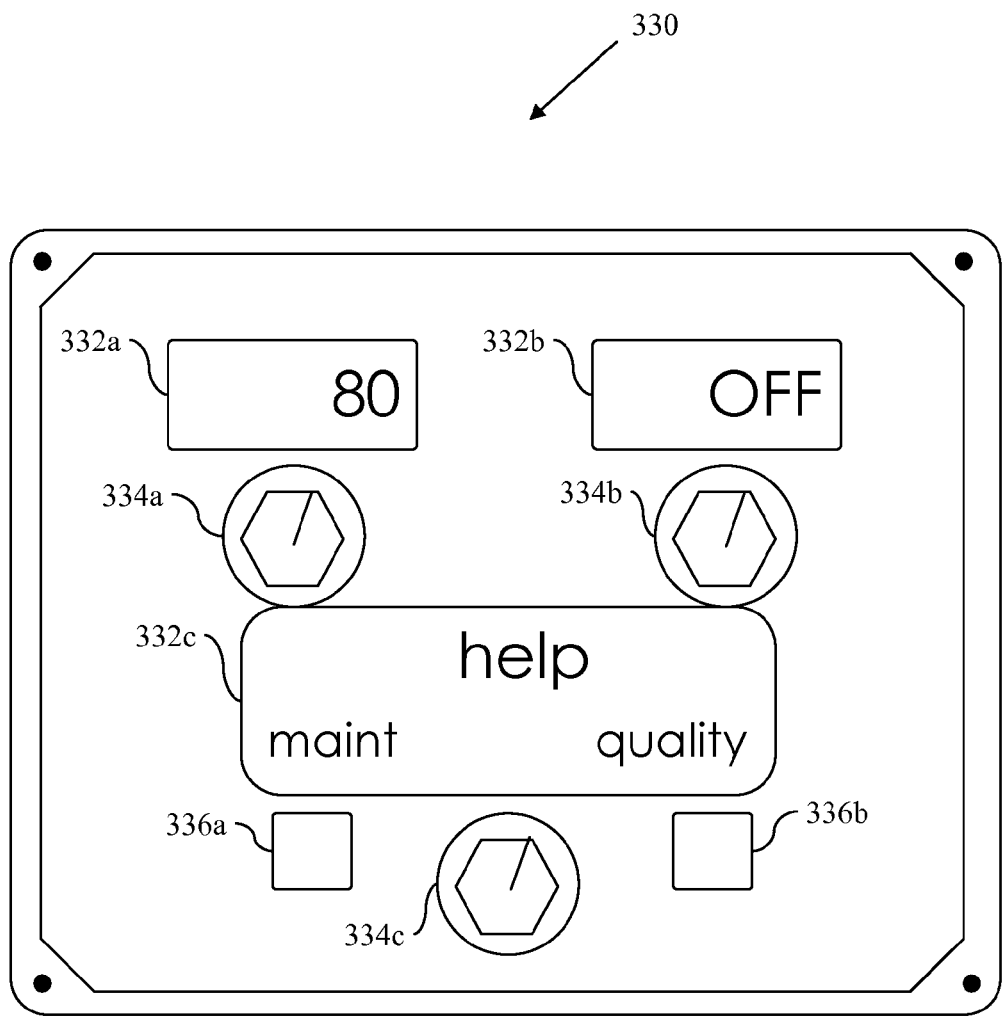
FIG. 3a illustrates an exemplary welder user interface for an exemplary welding system with help request communication functionality.

FIG. 3a illustrates an exemplary user interface 330. The user interface 330 includes displays 332a-c, knobs 334a-c, and soft buttons 336a-b. In the illustrated embodiment, a user may operate knob 334c, for example, to select from a series of menus. The user may operate the soft button 336a to select the help request menu (help) from the series of menus. In the help request menu, the user may operate the knob 334c to scroll through entities to whom help requests may be sent. The user interface 330 indicates on display 332c that help requests may be sent to a maintenance entity (maint) and a quality entity (quality). The user may operate one of the soft buttons 336a-b to select between displayed entities. The user interface may include various types of displays (LED, LED displays, LCD, and so on) and various input types (touch screens, dials, knobs, buttons, click wheels, roller balls, roller pads, mice, and so on).

Returning to FIG. 3, the welder 310 includes a data store 340. The data store 340 stores welder data and entity data. Welder data includes welder identification and location information (e.g., serial number, model number, IP address, physical address, global positioning coordinates, physical location relative to a facility or other equipment, and so on). Entity data includes data correlating the entities to respective communication modes. Communication modes include, but are not limited to, electronic mail, SMS text message, push notifications, voice message, combinations thereof, and so on. The data correlating the entities to the respective communication modes include, but is not limited to, data indicating a device (e.g., PDA, telephone, smart phone, computer, pager, combinations thereof, and so on) in which the entity would receive the help request and data indicating the address at which the help request is to be sent or directed (e.g., telephone number, IP address, email address, MAC address, mobile equipment identifier (MEID), electronic serial number (ESN), username, combinations thereof, and so on).

In one embodiment, the entity data includes data correlating at least some of the entities to multiple communication modes or multiple addresses. For example, the entity data may include data correlating an entity to electronic mail as the primary communication mode and to voice message as the secondary communication mode. In another example, the entity data may include data correlating an entity to a first address as the primary address and to a second address and the secondary address.

FIG. 3b illustrates an exemplary data store 340. The data store 340 includes entity data 342 and welder data 344.

In the illustrated embodiment, the entity data 342 includes a table correlating entities to modes of communication and addresses. For example, the entity data 342 correlates an entity named "Maintenance" to electronic email "Email" as the communication mode and "maint@lincolelectric.com" as the electronic email address. Similarly, the entity data 342 correlates other entities to communications modes and addresses.

In the illustrated embodiment, the welder data 344 includes a table correlating the welder to a serial number, an IP address, a physical location indicator. For example, the welder data 344 correlates the welder "PW S350" to serial number "S009876543," to IP address "207.54.157.1," and to a physical location indicator described as "1st Quadrant of Rim Production Floor, 22801 St. Clair Ave., Cleveland, Ohio 44117."

Returning to FIG. 3, the welder 310 further includes a communication logic 350. The communication logic 350 receives a signal from the user interface 330 indicating the user selection of an entity. The communication logic 350 further receives from the data store 340 the welder data corresponding to the welder 310 and the entity data corresponding to the user selected entity. Based on the received information, the communication logic 350 generates help requests in at least one format corresponding to the communication mode or modes correlated in the entity data to the selected entity. The communication logic 350 generates the help requests directed to the address or addresses correlated to the selected entity in the entity data.

In one embodiment, the communication logic 350 generates the help request in at least two formats, a first format corresponding to a primary communication mode and a second format corresponding a secondary communication mode. In another embodiment, the communication logic 350 generates the help request directed to at least two addresses, a first address corresponding to a primary address and a second address corresponding a secondary address.

In one embodiment, an entity includes a plurality of persons or network devices and the communication logic 350 generates a plurality of instances of the help request, each instance corresponding to one person or network device from the plurality of persons or network devices. For example, if the maintenance group has three employees, A, B, and C, who perform maintenance on welders, the communication logic 350 generates three instances of the help request, a first instance addressed to employee A, a second instance addressed to employee B, and a third instance addressed to employee C.

The welder 310 further includes a processor 360 operably connected to the network interface 320 and the communication logic 350. The processor 360 causes the network interface 320 to transmit the help request or multiple instances of the help request in the network 315.

In the illustrated embodiment, the welder 310 transmits the help request via the network 315 to a remote interface 370. The remote interface 370 includes servers configured to receive the help request and transmit it to the entity in the appropriate communication mode. The remote interface 370 includes an email server 375 that receives the help request and transmits a help request electronic mail to the entity in cases where electronic mail is the appropriate communication mode. The remote interface 370 includes a text messaging server 380 that receives the help request and transmits a help request text message to the entity in cases where text messaging is the appropriate communication mode. The remote interface 370 includes a voice messaging server 385 that receives the help request and transmits a help request voice message to the entity in cases where voice messaging is the appropriate communication mode. The remote interface 370 may include other messaging servers such as server 390 that receives the help request and transmits a help request message to the entity in the appropriate communication mode.

Figure 4:
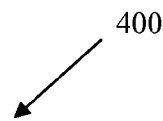
FIG. 4 illustrate an exemplary help request electronic mail.

FIG. 4 illustrate an exemplary help request electronic mail 400. The electronic mail 400 includes a "To:" field indicating the entity receiving the help request electronic mail 400. The electronic mail 400 further includes a "From:" field indicating identification of the welder or related equipment whose user is requesting help. In one embodiment, identification of the welder includes a given name such as the model number or some other name (e.g., PW S350). In another embodiment, identification of the welder includes the welder serial number (e.g., S009876543). In yet another embodiment, identification of the welder includes the welder's IP address (e.g., 207.54.157.1). In the illustrated embodiment, identification of the welder includes a combination of the given name, the serial number, and the IP address. In other embodiments (not shown), identification of the welder includes identification other than the given name, the serial number, and the IP address (e.g., an asset number, a tracking number, and so on).

The electronic mail 400 further includes a "Subject:" field indicating that the electronic mail 400 is a help request message. The electronic mail 400 further includes body text indicating the physical location of the welder or related equipment whose user is requesting help.

In one embodiment, physical location information appears in the "From:" or "Subject:" fields. Help request text messages, voice messages, or any other type of messages would have a similar format that includes at least information identifying the welder or related equipment whose user is requesting help.

Figure 5:
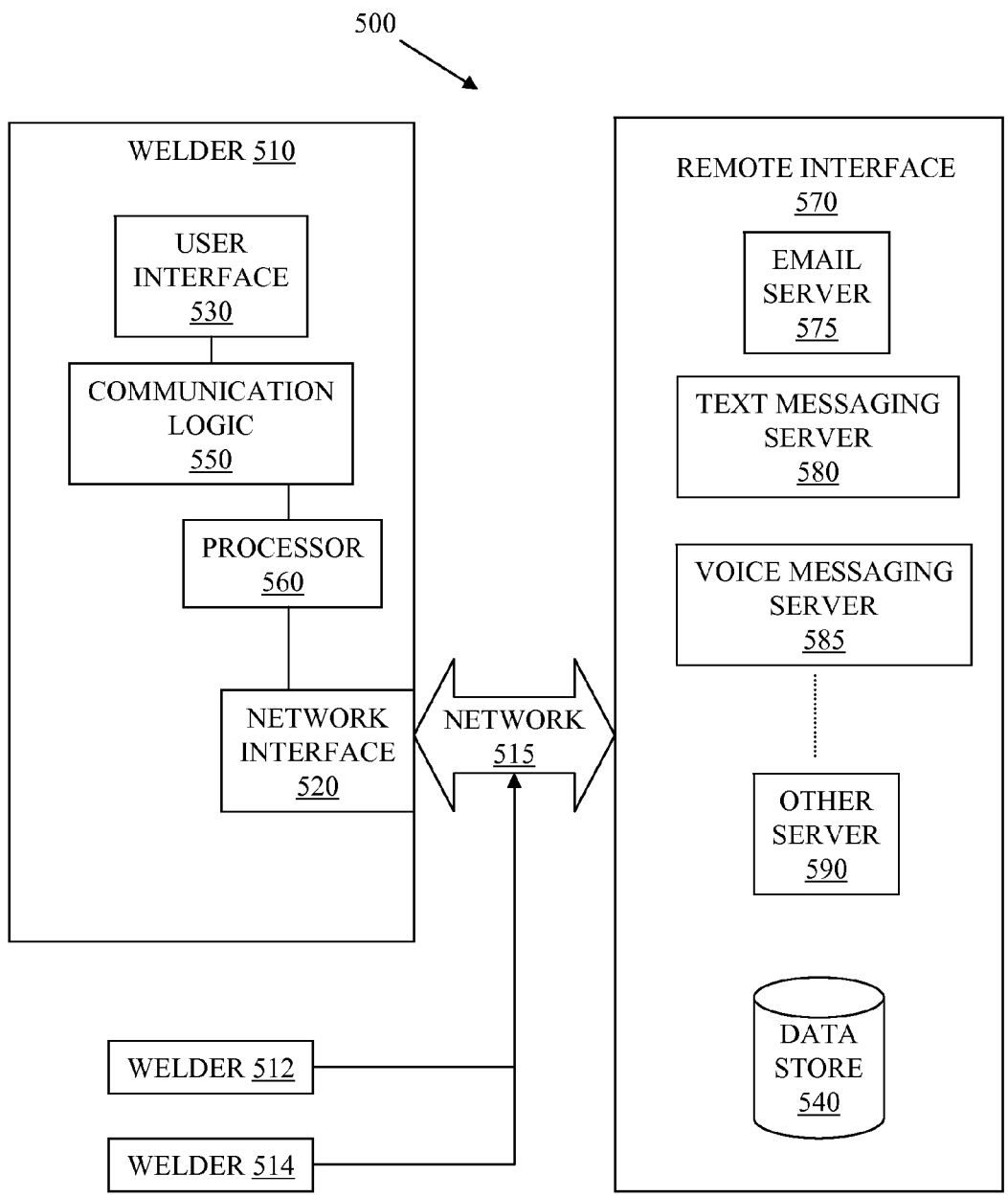
FIG. 5 illustrates an exemplary block diagram of an alternatively arranged welding system with help request communication functionality.

FIG. 5 illustrates an exemplary block diagram of an alternatively arranged welding system 500. The welding system 500 includes the welder 510 and additional welders 512 and 514, which all connect to the network 515.

The welder 510 includes a network interface 520 that connects the welder 510 to the network 515. The welder 510 further includes a user interface 530 that indicates to a user of the welder 510 one or more entities to whom help requests may be sent. The user interface 530 also receives from the user a selection indicating a selected entity. The welding system 500 includes a data store 540, however unlike in exemplary welding system 300 discussed above, the data store 540 is located remote from the welder 510. The welder 510, as well as the other welders, 512 and 514, in the network 515 may obtain data from data store 540 via the network 515.

The welder 510 further includes a communication logic 550 that receives a signal from the user interface 530 indicating the user selection of an entity. The communication logic 550 receives data from the data store 540. In one embodiment, the communication logic 550 receives the welder data corresponding to the welder 510 and the entity data corresponding to the user selected entity from the data store 540. In another embodiment (not shown), the communication logic 550 receives the welder data from a data store other than the data store 540 which may be local or remote to welder 510. In one embodiment, the communication logic 550 receives only the entity data from the data store 540.

Based on the received information, the communication logic 550 generates help requests in at least one format corresponding to the communication mode or modes correlated in the entity data to the selected entity. The communication logic 550 generates the help requests directed to the address or addresses correlated to the selected entity in the entity data.

The welder 510 further includes a processor 560 operably connected to the network interface 520 and the communication logic 550. The processor 560 causes the network interface 520 to transmit the help request or multiple instances of the help request in the network 515.

In the illustrated embodiment, the welder 510 transmits the help request via the network 515 to a remote interface 570. The remote interface 570 includes servers 575, 580, 585, and 590 that receive the help request and transmit it to the entity in the appropriate communication mode.

Figure 6:
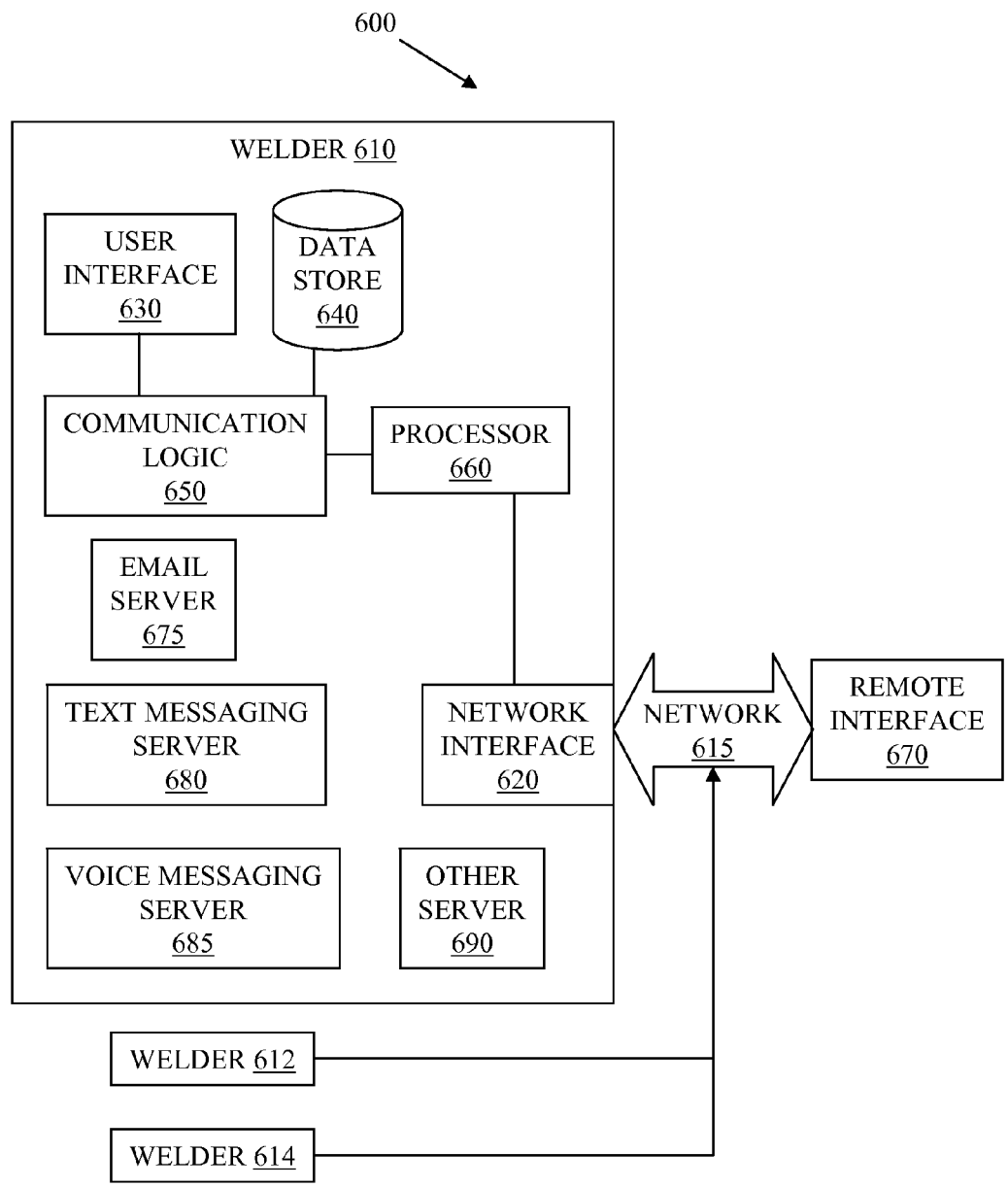
FIG. 6 illustrates an exemplary block diagram of an alternatively arranged welding system with help request communication functionality.

FIG. 6 illustrates an exemplary block diagram of an alternatively arranged welding system 600. The welding system 600 includes the welder 610 and additional welders 612 and 614, which all connect to the network 615.

The welder 610 includes a network interface 620 that connects the welder 610 to the network 615. The welder 610 further includes a user interface 630 that indicates to a user of the welder 610 one or more entities to whom help requests may be sent. The user interface 630 also receives from the user a selection indicating a selected entity. The welder 610 includes a data store 640. The data store 640 stores at least one of welder data and entity data. The welder 610 further includes a communication logic 650 that receives a signal from the user interface 630 indicating the user selection of an entity. The communication logic 650 further receives from the data store 640 at least one of the welder data corresponding to the welder 610 and the entity data corresponding to the user selected entity.

Based on the received information, the communication logic 650 generates help requests in at least one format corresponding to the communication mode or modes correlated in the entity data to the selected entity. The communication logic 650 generates the help request directed to the address or addresses correlated to the selected entity in the entity data.

The welder 610 includes servers configured to receive the help request and transmit it to the entity in the appropriate communication mode. The welder 610 may include an email server 675 that receives the help request and generates a help request electronic mail that the network interface 620 transmits to the entity. The welder 610 may include a text messaging server 680 that receives the help request and generates a help request text message that the network interface 620 transmits to the entity. The welder 610 may include a voice messaging server 685 that receives the help request and generates a help request voice message that the network interface 620 transmits to the entity. The welder 610 may include other messaging servers such as server 690 that receives the help request and generates a help request message that the network interface 620 may transmit to the entity in the appropriate communication mode.

The welder 610 further includes a processor 660 operably connected to the network interface 620 and the communication logic 650. The processor 660 causes the network interface 620 to transmit the help request message in the network 615. In the illustrated embodiment, the network interface 620 transmits the help request messages in the appropriate communication mode via the network 615 to a remote interface 670 that may be local or remote to the entity receiving the help request.

Figure 7:
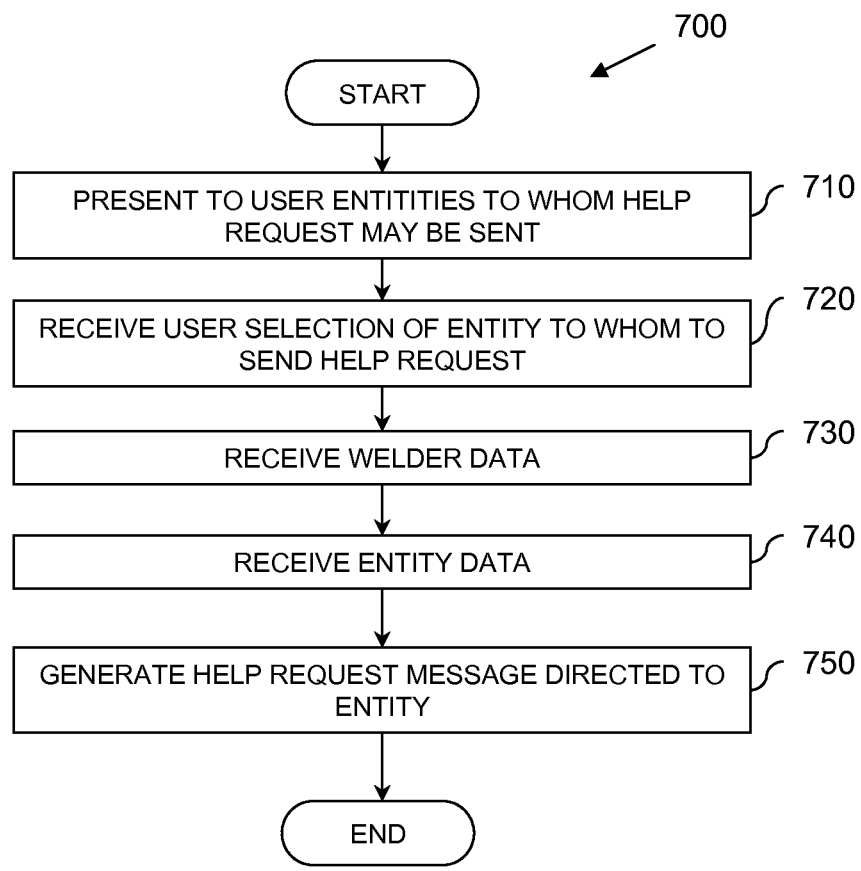
FIG. 7 illustrates an exemplary flow diagram of a method for a welder to receive and communicate help requests in a network.

Example methods may be better appreciated with reference to the flow diagram of FIG. 7. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown or described. Moreover, less than all the illustrated blocks may be required to implement an example methodology. Furthermore, additional or alternative methodologies can employ additional, not illustrated blocks.

In the flow diagram, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using hardware or software and using various programming approaches like machine language, procedural, object oriented or artificial intelligence techniques.

In one example, methodologies are implemented as processor executable instructions or operations provided on a computer-readable medium. Thus, in one example, a computer-readable medium may store processor executable instructions operable to perform a method. While the above method is described being provided on a computer-readable medium, it is to be appreciated that other example methods described herein can also be provided on a computer-readable medium.

While FIG. 7 illustrates various actions occurring in serial, it is to be appreciated that various actions illustrated in FIG. 7 could occur substantially in parallel. While a number of processes are described, it is to be appreciated that a greater or lesser number of processes could be employed and that lightweight processes, regular processes, threads, and other approaches could be employed. It is to be appreciated that other example methods may, in some cases, also include actions that occur substantially in parallel.

FIG. 7 illustrates an exemplary flow diagram of a method 700 for a welder to receive and communicate help requests in a network. The method 700 includes at 710 presenting to a user a plurality of entities to whom help requests may be sent. An entity may be a single person or machine, or an entity may include a plurality of persons or network devices. The method 700 further includes at 720 receiving a user selection of an entity from the plurality of entities to whom to send a help request. The user makes the selection via a user interface in the welder. The method 700 further includes at 730 receiving welder data including welder identification and location information. The welder data maybe local or remote to the welder and includes at least the minimum information necessary to identify the physical location of the welder whose user is requesting help. The method 700 further includes at 740 receiving entity data including data correlating the entity to communication mode information including at least one communication format (e.g., electronic mail, text message, voice message, and so on) and at least one address (e.g., email address, IP address, telephone number, ESN, and so on). The method 700 further includes at 750 generating a help request message directed to the entity. The help request message is formatted and addressed based on the communication mode information.

In one embodiment, where the entity includes a plurality of persons or network devices, the method generates a plurality of instances of the help request message, each instance corresponding to one person or network device.

Definitions

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Query," as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores or information sources.

"Signal," as used herein, includes but is not limited to one or more electrical or optical signals, analog or digital signals, data, one or more computer or processor instructions, messages, a bit or bit stream, or other means that can be received, transmitted or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, which is typically an operator of the machine in question.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A welder comprising:
a network interface configured to connect to a network;
a welder user interface configured to selectively display a help request menu upon receiving an input from a user of the welder via the welder user interface, and allow the user of the welder to initiate a help request for the welder, the help request menu indicating to the user of the welder one or more entities to whom help requests may be sent, and wherein the welder user interface is further configured to receive from the user of the welder a selection indicating a selected entity from the one or more entities to whom to send the help request;
a data store storing welder data and entity data, where the welder data includes welder identification and location information and where the entity data includes data correlating entities from the one or more entities to respective communication modes;
a communication logic configured to receive a signal from the welder user interface indicating the selection and further configured to receive from the data store the welder data and the entity data corresponding to the welder and the selected entity respectively, and where the communication logic is further configured to generate the help request in at least one format corresponding and directed to a communication mode correlated to the selected entity; and
a processor operably connected to the network interface and the communication logic and configured to cause the network interface to transmit the help request in the network.

2. The welder of claim 1, where the help request menu simultaneously displays both of a maintenance entity and a quality entity, for individual selection by the user of the welder, to receive the help request 3. The welder of claim 1, where the communication modes include one or more of:
electronic mail, SMS text message,
push notifications, and
voice message; and
where the welder identification and location information includes one or more of:
a welder serial number,
a welder tracking number,
a welder model number,
an asset number,
an IP address,
a physical address,
global positioning coordinates, and
a physical location relative to a facility or other equipment.

4. The welder of claim 1, where the communication modes correspond to one or more of:
a PDA,
a telephone,
a smart phone,
a computer, and
a pager.

5. The welder of claim 1, where the entity data includes one or more of:
a telephone number,
an IP address,
an email address,
a MAC address,
a mobile equipment identifier (MEID),
an electronic serial number (ESN), and
a username.

6. The welder of claim 1, where the entity data includes data correlating at least some of the entities to a primary communication mode and a secondary communication mode, and where the communication logic is configured to generate the help request in at least two formats, a first format corresponding and directed to the primary communication mode and a second format corresponding and directed to the secondary communication mode.

7. The welder of claim 1, where an entity includes a plurality of persons or network devices, and where the communication logic is configured to generate a plurality of instances of the help request, each instance corresponding to one person or network device from the plurality of persons or network devices, in response to said selection indicating the selected entity, and where the processor is configured to cause the network interface to transmit the plurality of instances of the help request in the network.

8. A method for a welder to receive and communicate help requests in a network, the method comprising:
receiving, from a user of the welder, a selection to display a help request menu, via a welder user interface on the welder;
locally displaying to the user of the welder, by the welder user interface, the help request menu, where the help request menu provides a plurality of entities to whom help requests may be sent;
receiving, from the user of the welder, a user selection of an entity from the plurality of entities to whom to send a help request;
receiving welder data including welder identification and location information;
receiving entity data including data correlating the at least one entity to communication mode information including at least one communication format and at least one address; and
generating a help request message directed to the at least one entity, where the help request message is formatted and addressed based on the communication mode information.

9. The method of claim 8, where the help request menu simultaneously displays both of a maintenance entity and a quality entity, for individual selection by the user of the welder, to receive the help request.

10. The method of claim 8, where the at least one communication format includes one or more of:
electronic mail,
SMS text message,
push notification, and
voice message; and
where the welder data includes one or more of:
welder serial number,
welder model number,
tracking id,
asset id,
welder IP address,
welder physical address,
welder global positioning coordinates, and
welder physical location relative to a facility or other equipment.

11. The method of claim 8, where the at least one address corresponds to one or more of:
a PDA,
a telephone,
a smart phone,
a computer, and
a pager.

12. The method of claim 8, where the at least one address is one or more of:
a telephone number,
an IP address,
an email address,
a MAC address,
a mobile equipment identifier (MEID),
an electronic serial number (ESN), and
a username.

13. The method of claim 8, where the entity includes a plurality of persons or network devices, and where the generating generates a plurality of instances of the help request message, each instance corresponding to one person or network device from the plurality of persons or network devices, in response to said user selection of the entity.

14. An article of manufacture for use in relation to a welding system, the article of manufacture comprising:
a welder including a welder user interface and a processor, wherein
the welder user interface is configured to selectively display a help request menu upon receiving an input from a user of the welder via the welder user interface, and allow the user of the welder to initiate a help request for the welder, the help request menu indicating to the user of the welder one or more entities to whom help requests may be sent, and wherein the welder user interface is further configured to receive from the user of the welder a selection indicating a selected entity from the one or more entities to whom to send the help request; and
the processor is configured to generate the help request upon receipt of the a selection signal,
where the help request includes welder data including welder identification information, where the processor is further configured to obtain entity data corresponding to the selected entity, where the entity data includes data correlating the selected entity to respective communication modes, where the processor is configured to cause the generation of the help request in at least one format corresponding to a communication mode correlated to the selected entity, and where the processor is further configured to cause transmission of the help request in the network.

15. The article of manufacture of claim 14, where the help request menu simultaneously displays both of a maintenance entity and a quality entity, for individual selection by the user of the welder, to receive the help request.

16. The article of manufacture of claim 14, where the processor is configured to cause generation of the help request directed to one or more of a telephone number, an IP address, an email address, a MAC address, a mobile equipment identifier (MEID), an electronic serial number (ESN), and a username corresponding to the selected entity as correlated in the entity data.

17. The article of manufacture of claim 14, where the at least one format includes one or more of:
   electronic mail,
   SMS text message,
   push notification, and
   voice message; and
where the welder identification information includes one or more of:
   a welder serial number,
   a welder model number,
   an IP address,
   a physical address,
   global positioning coordinates, and
   a physical location relative to a facility or other equipment.

18. The article of manufacture of claim 14, where the processor is configured to cause the generation of the help request in at least one format optimized for transmission to at least one of a PDA, a telephone, a smart phone, a computer, and a pager as correlated in the entity data.

19. The article of manufacture of claim 14, where the entity data includes data correlating at least some of the entities to a primary communication mode and a secondary communication mode, and where the processor is configured to cause generation of the help request in at least two formats, a first format corresponding and directed to the primary communication mode and a second format corresponding and directed to the secondary communication mode.

20. The article of manufacture of claim 14, where an entity includes a plurality of persons or network devices, and where the processor is configured to cause generation of a plurality of instances of the help request, each instance corresponding to one person or network device from the plurality of persons or network devices, in response to said selection indicating the selected entity, and where the processor is further configured to cause transmission of the plurality of instances of the help request in the network.

* * * * *